(12) United States Patent
Myers et al.

(10) Patent No.: US 8,689,742 B2
(45) Date of Patent: Apr. 8, 2014

(54) INTEGRATED COOLANT FLOW CONTROL AND HEAT EXCHANGER DEVICE

(75) Inventors: John William Myers, Howell, MI (US); Mark Allen Bourcier, Canton, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 1140 days.

(21) Appl. No.: 12/625,521

(22) Filed: Nov. 24, 2009

(65) Prior Publication Data

US 2011/0120396 A1    May 26, 2011

(51) Int. Cl.
 *F01P 7/14* (2006.01)
 *F01P 1/06* (2006.01)
 *F01P 9/00* (2006.01)

(52) U.S. Cl.
 USPC ............... 123/41.08; 123/41.31; 123/41.01

(58) Field of Classification Search
 USPC ............ 123/41.29, 41.1, 41.08, 41.09, 41.19, 123/41.33
 See application file for complete search history.

(56) References Cited

U.S. PATENT DOCUMENTS

| | | | |
|---|---|---|---|
| 3,190,272 A * | 6/1965 | Falk | 123/41.09 |
| 5,894,834 A * | 4/1999 | Kim | 123/552 |
| 6,182,749 B1 | 2/2001 | Brost et al. | |
| 6,371,060 B1 | 4/2002 | Lehmann et al. | |
| 6,705,586 B2 | 3/2004 | Williges | |
| 6,796,375 B2 | 9/2004 | Williges | |
| 6,997,143 B2 | 2/2006 | Piccirilli et al. | |
| 7,077,776 B2 | 7/2006 | Sorab et al. | |
| 7,168,397 B2 | 1/2007 | Chanfreau et al. | |
| 7,261,068 B1 * | 8/2007 | Wantschik | 123/41.29 |
| 7,322,399 B2 * | 1/2008 | Guerrero et al. | 165/101 |
| 7,332,399 B2 * | 2/2008 | Kato | 438/295 |
| 2005/0000473 A1 * | 1/2005 | Ap et al. | 123/41.1 |

* cited by examiner

*Primary Examiner* — Lindsay Low
*Assistant Examiner* — Syed O Hasan
(74) *Attorney, Agent, or Firm* — Edwards Wildman Palmer LLP; Peter F. Corless

(57) ABSTRACT

A coolant flow control system (100, 200) includes an integrated coolant flow control and heat exchange device (10, 50). The device includes a valve body part (20, 60) and a heat exchange part (30, 70). According to the system, all the coolant flow from the engine is delivered back to the engine after passing through the valve body part (20, 60) and then the heat exchange part (30, 70) in which it passes over the heat exchanger part (40, 80). The valve body part (20, 60) by positioning of the coolant flow wall (26, 66) allows multiple flow modes and coolant paths to branch out (or converge) from (or to) thereby controlling the flow in all coolant circuit branches.

25 Claims, 5 Drawing Sheets

INTEGRATED COOLANT FLOW CONTROL AND HEAT EXCHANGER DEVICE

BACKGROUND (a) Technical Field

The present disclosure relates to an integrated coolant flow control and heat exchange device for a vehicle.

(b) Background Art

Generally, a vehicle includes an internal combustion engine, a transmission, a unit heater, a radiator, a pump for delivering a coolant to the engine, and an engine control module. A typical cooling system used in a vehicle includes three main flow circuits: an engine bypass circuit, a circuit including a unit heater, and a circuit including a radiator.

Coolant flow may be controlled by a simple traditional wax pellet fixed temperature thermostat or a more complex coolant control valve with a drive motor, which has been developed as a replacement to the traditional wax pellet type thermostat. The coolant control valve changes coolant flow within circuits based on a signal from a vehicle engine control module unit which is derived from engine coolant temperature.

The coolant control valve reduces engine warm up time by blocking coolant flow at initial cold start and also allowing the engine (coolant and oil) to operate at a higher temperature during normal driving to improve the engine lubricity by controlling the coolant temperature (and engine oil by default) within the engine at higher average temperatures.

The coolant control valve, however, does not provide a more rapid increase in the temperature of the transmission oil circuit because of positional limitation of a transmission oil cooler. More specifically, the transmission oil cooler is typically located in a radiator end tank (i.e., oil to liquid (coolant) type heat exchanger), in the air stream (i.e., air to oil cooler) in front of the vehicle engine cooling module, or both in series depending on transmission cooling demand requirements. Alternatively, it may be provided as a remotely mounted stand alone oil to coolant type cooler.

Such a transmission oil cooler is located within one of the three main flow circuits or an auxiliary circuit. Accordingly, as the coolant flows through multiple coolant circuits, the transmission oil cooler is not fully utilizing the maximum cooling potential available for transmission oil cooling.

Meanwhile, in case where the transmission oil cooler is located in the front end area of the vehicle (either in the radiator tank or air stream), during cold weather driving the transmission oil is typically cooled to the minimum operating temperature if allowed to flow within the heat exchangers provided for cooling. This causes the oil to warm up slowly and can also cause the oil to operate at a temperature which is lower than the temperature for optimum transmission oil lubricity. As a result, more transmission mechanical drag can be caused and vehicle fuel economy during cold weather conditions can be reduced. In case of the air to oil transmission oil cooler, if there is not a temperature bypass valve in the flow circuit, the oil in the cooler can get so cold and thick that the oil cooler may freeze and may not ever allow oil to pass through the cooler and, in some cases, may cause the transmission to be overheated and be damaged due to no oil flow through the transmission oil cooler.

Although devices and systems were proposed to increase the speed of transmission oil warm up, as disclosed in, for example, U.S. Pat. Nos. 6,182,749; 6,371,060; 6,997,143; 6,705,586; 6,796,375; 7,077,776 and 7,168,397, there is still a need for an improved device or system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an integrated coolant flow control and heat exchange device for a vehicle including an internal combustion engine, a transmission, a unit heater, a radiator, an engine control module, and a pump for delivering an engine coolant to the engine, the device comprising: a heat exchange part and a valve body part.

In one aspect, the present invention provides an integrated coolant flow control and heat exchange device. According to an embodiment, the integrated coolant flow control and heat exchange device for a vehicle, which includes an internal combustion engine, a transmission, a unit heater, a radiator, an engine control module, and a pump for delivering an engine coolant to the engine, comprises: a heat exchange part and a valve body part. The heat exchange part includes an outlet for discharging a coolant from the heat exchange part toward the pump, a first inlet for receiving a coolant coming from the radiator, a second inlet for receiving a coolant coming from the unit heater, and a heat exchanger provided inside the heat exchange part. The heat exchanger includes an inlet for receiving from a source of supply a vehicle fluid and an outlet for discharging the vehicle fluid from the heat exchanger toward the supply source by which the heat exchanger is in fluid communication with the supply source. The valve body part includes an inlet for receiving from a coolant coming from the engine, a first outlet for discharging a coolant from the valve body part toward the radiator, and a second outlet for discharging a coolant from the valve body part toward the unit heater.

The valve body part further includes a third outlet, the heat exchange part further includes a third inlet, and the third outlet of the valve body part is connected to the third inlet of the heat exchange part, thereby making the valve body part and the heat exchange part in fluid communication with each other which functions as the engine bypass so that none, some or all of the coolant inside the valve body part can be delivered to the heat exchange part to warm up and cool down the vehicle fluid inside the heat exchanger by heat exchange therebetween.

An integrated coolant flow control and heat exchange device according to another embodiment includes a heat exchange part and a valve body part. The heat exchange part includes an outlet for discharging a coolant from the heat exchange part toward the pump and a heat exchanger provided inside the heat exchange part. The heat exchanger includes an inlet for receiving a vehicle fluid from a supply source and an outlet for discharging a vehicle fluid from the heat exchanger toward the fluid supply source by which the heat exchanger is in fluid communication with the fluid supply source. The valve body part includes a first inlet for receiving a coolant coming from the engine, a second inlet for receiving a coolant coming from the radiator, and a third inlet for receiving a coolant coming from the unit heater.

The valve body part further includes an outlet, the heat exchange part further includes an inlet, and the outlet of the valve body part is connected to the inlet of the heat exchange part so that all of the coolant inside the valve body part can be delivered to the heat exchange part to warm up and cool down the vehicle fluid inside the heat exchanger by heat exchange there between.

In another aspect, the present invention provides coolant flow control systems including the above-described devices.

The above and other aspects and features of the invention are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not imitative of the present invention, and wherein.

Figure 1:
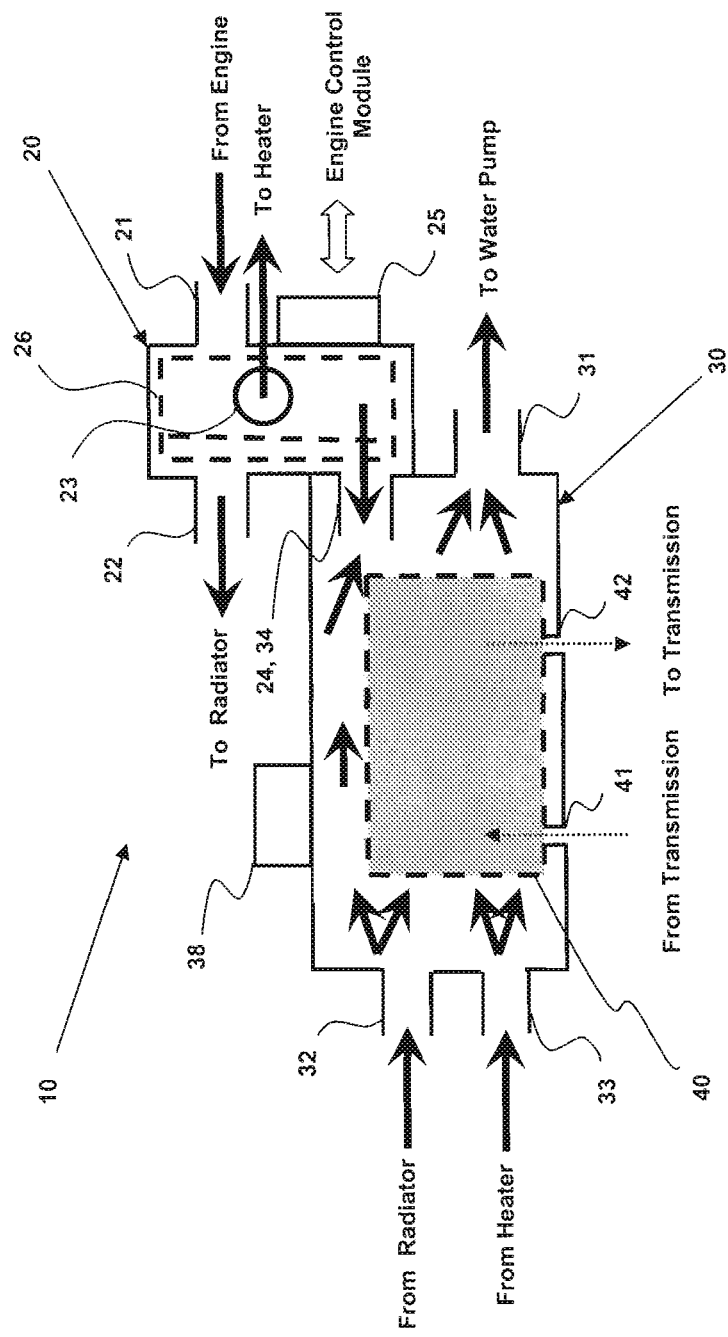
FIG. 1 shows an integrated coolant flow control and heat exchange device according to a first embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 shows an integrated coolant flow control and heat exchange device (10) for a vehicle according to a first embodiment of the present invention. The vehicle includes an internal combustion engine, a transmission, a unit heater, a radiator, an engine control module, and a pump for delivering an engine coolant to the engine. The integrated coolant flow control and heat exchange device (10) includes a valve body part (20) and a heat exchange part (30). The valve body part (20) includes at least one inlet and at least one outlet. Preferably, as shown in FIG. 1, it may include an inlet (21), a first outlet (22), a second outlet (23), and a third outlet (24). The heat exchange part (30) includes at least one inlet and at least one outlet. Preferably, as shown in FIG. 1, it may include an outlet (31), a first inlet (32), a second inlet (33), and a third inlet (34).

The inlet (21) of the valve body part (20) is provided to receive a coolant coming from the engine. The first outlet (22) of the valve body part (20) is provided to discharge a coolant from the valve body part (20) toward the radiator. The second outlet (23) of the valve body part (20) is provided to discharge a coolant from the valve body part (20) toward the unit heater. The outlet (31) of the heat exchange part (30) is provided to discharge all coolant from the heat exchange part (30) toward the pump. The first inlet (32) of the heat exchange part (30) is provided to receive a coolant coming from the radiator. The second inlet (33) of the heat exchange part (30) is provided to receive a coolant coming from the unit heater. The third outlet (24) of the valve body part (20) is connected to the third inlet (34) of the heat exchange part (30) which takes the place of the traditional engine bypass circuit. The valve body part (20) controls the coolant flow so that none, some or all of the coolant can be delivered to the heat exchange part (30) to thereby warm up and cool down a vehicle fluid inside the heat exchanger (40) by heat exchange therebetween.

The valve body part (20) further includes a flow wall (26) for flow control. The flow wall (26) within the valve body part (20) functions to control the amount of a coolant flowing into various system circuits. For the design shown in FIG. 1, the flow wall (26) may be shaped like an inverted cup with varying opening shapes made in the cup which coincides with the different outlets. The flow wall (26) is capable of blocking all flow to an outlet or controlling any percent of flow up to full flow to any outlet depending on system requirements. The flow amount can be, suitably, controlled by unique controlled opening patterns located in the flow wall (26) designed to meet specific system coolant flow amounts based on circuit requirements.

The heat exchange part (30) further includes a (liquid to liquid) heat exchanger (40) provided inside the heat exchange part (30). The heat exchanger (40) includes at least one inlet and at least one outlet. Preferably, it may include an inlet (41) and an outlet (42), as shown in FIG. 1. The inlet (41) is provided ideally for receiving a vehicle fluid from a supply source and the outlet (42) is provided for discharging the vehicle fluid from the heat exchanger (40). Examples of the vehicle fluid may include, but not limited to, a transmission oil, an engine oil, a power steering, a differential oil, a trans axle oil, electric cooler, converter oil, generator oil, a/c cabin refrigerant or any kind of fluids for use in any other system or device within the vehicle requiring cooling or warming. The vehicle fluid can be any type of fluids, gases or mixtures requiring cooling or heating such as oils, refrigerants, coolants or salts. Only for illustration purposes, the device (10) shown in FIG. 1 (and other drawings) is described to include a transmission oil as the vehicle fluid and a transmission as the supply source.

The device (10) further includes an actuator (25) on or near the valve body part (20). The actuator (25) is configured to operate in response to a control signal from the engine control module so as to selectively operate the movement of the flow wall (26) which opens, varies and/or closes the flow through the outlet (22, 23, 24) of the valve body part (20) in response to respective control signals from the engine control module. The actuator (25) can be realized in various forms known in the art. One example is a step motor controlled by a signal received from the engine controller which, depending on coolant and oil temperatures, can control the flow wall (26) position to optimize coolant flow within the circuits.

Preferably, the device (10) further includes a pressure cap (38) on a portion of the heat exchange part (30). The pressure cap (38), similar to a traditional spring actuated pressure cap, may function as a controller of the coolant operating pressure within the system and/or as an access point in the system for adding coolant for system servicing.

The shape, size, and position of the valve body part (20) are not limited to particular ones and can be independently changed according to design choices and/or operational conditions. For instance, the valve body part (20) may have a circular cross section.

Likewise, the position, shape and size of the inlet (21) and the first, second, and third outlets (22, 23, 24) of the valve body part (20), the outlet (31) and the first, second, and the third inlets (32, 33, 34) of the heat exchange part (30), and the inlet (41) and the outlet (42) of the heat exchanger (40) are not limited to particular ones and can be independently changed according to design choices and/or operational conditions. For example, the inlets (21, 32, 33, 34, 41) and the outlets (22, 23, 24, 31, 42) each may have a circular cross section. Preferably, some or all of the inlets (21, 32, 33, 34, 41) and the outlets (22, 23, 24, 31, 42) may be designed to have identical or different shapes and sizes. Suitably, the third outlet (24) and the third inlet (34) may be formed integrally or separately.

In addition, additional ports may be added to supply a coolant to other branch coolant circuits (not shown). For example, there may be an additional outlet(s) similar to the outlet (23) which can flow a coolant to other possible circuit needs (i.e.: engine cooler, power steering cooler, electric cooler fluid or any other systems or devices provided within a vehicle for cooling or warming).

The valve body part (20) may be formed integrally with the heat exchange part (30) while being in fluid communication with the heat exchange part (30). Alternatively, it may be located remotely from the heat exchange part (30) while being in fluid communication with the heat exchange part (30).

Also, the heat exchange part may include a plurality of heat exchangers. For example, as shown in FIG. 5, the heat exchange part (130) may include two heat exchangers (131, 132).

Further, the heat exchange part (30) may, suitably, be mounted on a predetermined portion or portions of a supply source housing (102) (e.g., transmission housing) while being in fluid communication with the supply source housing (102). Alternatively, it may be placed remotely from the supply source housing (102) while being in fluid communication with the supply source housing (102).

Figure 5:
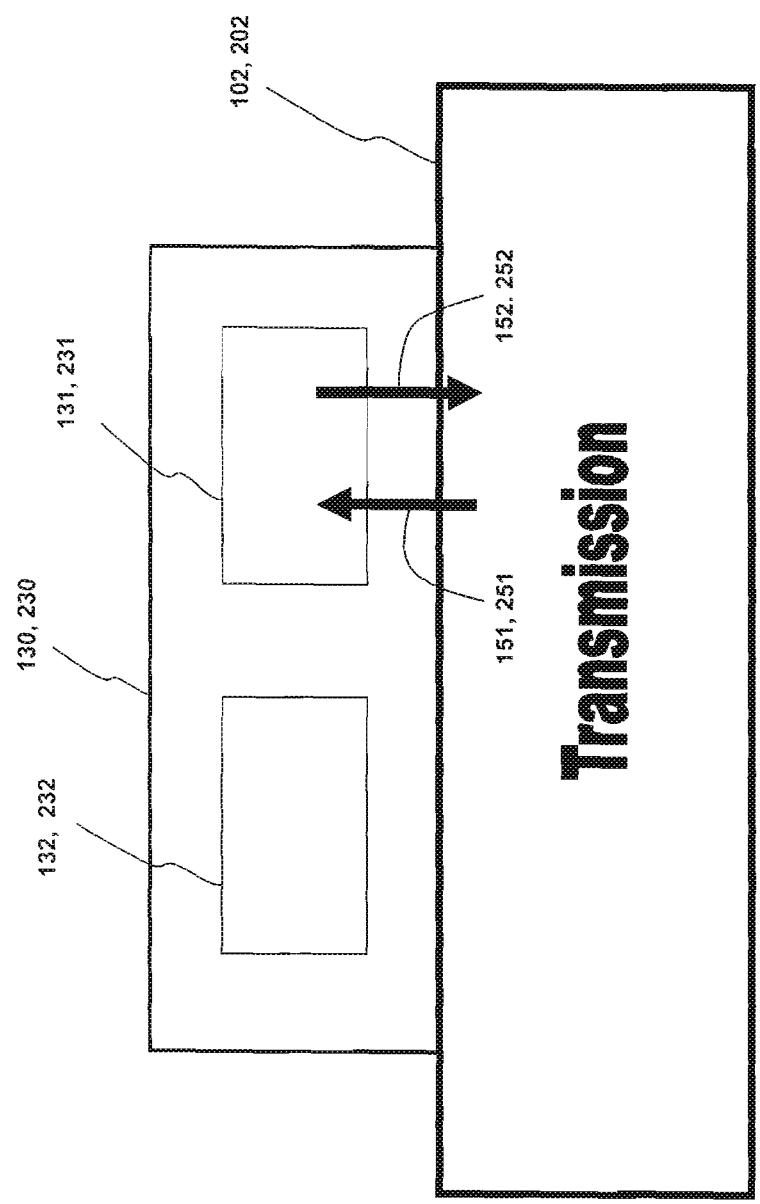
FIG. 5 is a schematic diagram of an integrated coolant flow control and heat exchange device according to an embodiment of the present invention the heat exchange part of which is mounted on a supply housing of a vehicle and includes a plurality of heat exchangers.

In an exemplary embodiment, as shown in FIG. 5, the heat exchange part (130) may be mounted on a portion of the supply source housing (102) (e.g., transmission housing). The heat exchange part (130) may have a first heat exchanger (131) and a second heat exchanger (132). In this case, although not shown, the valve body part (20) may be disposed in the above-described manner.

In this embodiment, the first heat exchanger (131) may be in fluid communication with the supply housing (102) through a first heat exchanger inlet (151) and a first heat exchanger outlet (152), which are similar to the inlet (41) and outlet (42), respectively. The first heat exchanger inlet (151) and outlet (152) can be formed either in the supply source housing (102) while being in fluid communication with the first heat exchanger (131) or in the other vehicle system(s) while being in fluid communication with the first heat exchanger (131). The second heat exchanger (132) may fluid communicate with the supply source housing (102) through a second heat exchanger inlet (not shown) and a second heat exchanger outlet (not shown) which are similar to the first exchanger inlet (151) and outlet (152). Alternatively, the second heat exchanger (132) may be designed to be in fluid communication with additional vehicle systems (not shown) that need either cooling or warming. As discussed above, the mounting position of the heat exchange part and the number of the heat exchangers located within the heat exchange part can be adjusted according to design choice and operational condition.

The term "vehicle fluid" used herein refers to any type of fluids for use in any systems or devices within a vehicle for cooling or warming purpose. Accordingly, it may be, e.g., oils, refrigerants, coolants or salts and may be in the form of liquid, gas, or mixture thereof. Non-limiting examples of the fluid include a transmission oil, an engine oil, a power steering oil, a differential oil, a trans axle oil, an electric cooler fluid, a converter oil, a generator oil, and an a/c cabin refrigerant.

Figure 2:
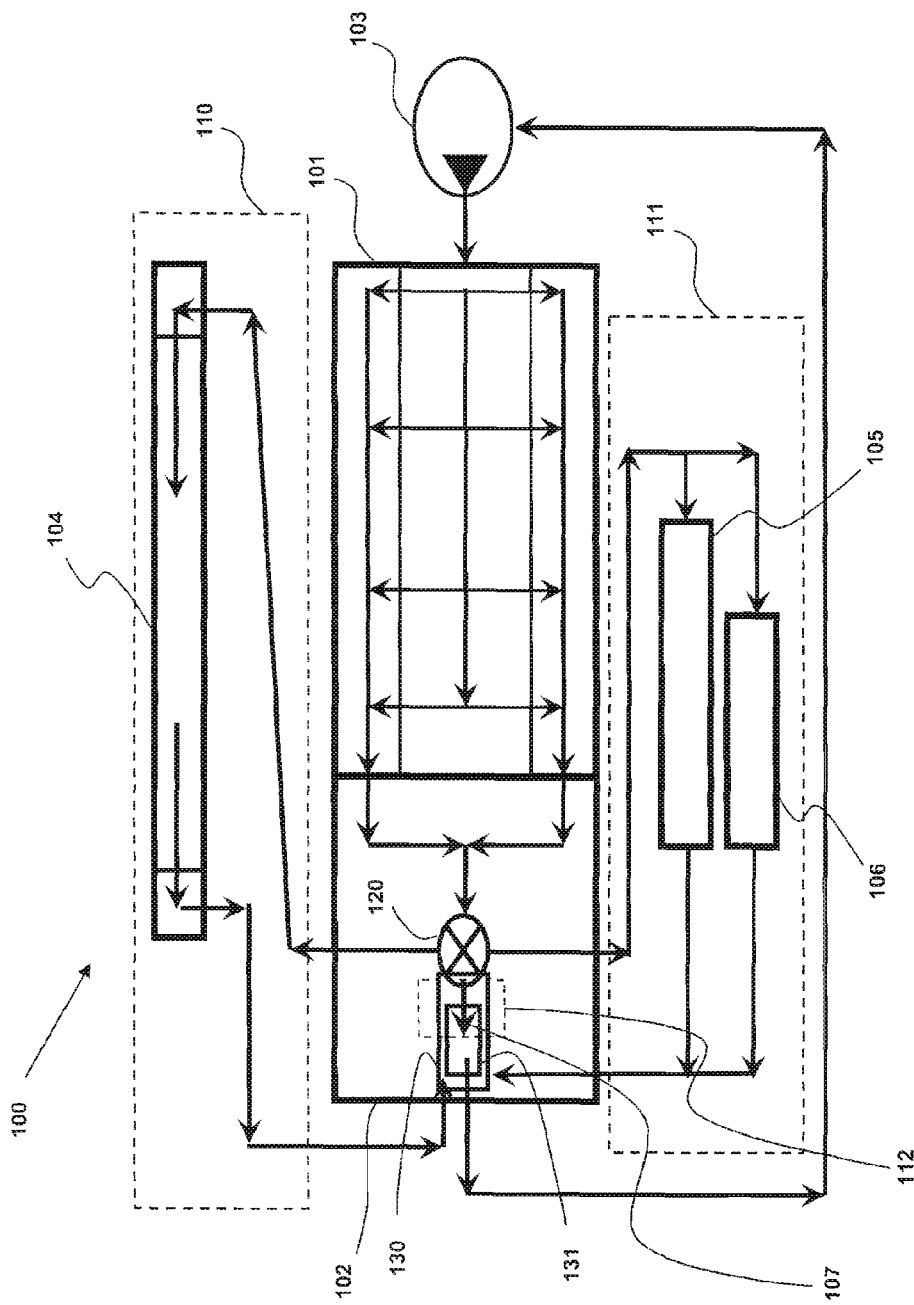
FIG. 2 shows a coolant flow control system including the device of FIG. 1.

Referring to FIG. 2, a coolant flow control system (100) including the integrated coolant flow control and heat exchange device (10) according to the first embodiment is described.

The coolant control system (100) includes an integrated coolant flow control and heat exchange device (10), an engine (101), a pump (103), a radiator (104), a unit heater (105) and a throttle body warmer (106).

The integrated coolant flow control and heat exchange device (10) includes a valve body part (120) and a heat exchange part (130) in fluid communication with the valve body part (120). The valve body part (120) is in fluid communication with the engine (101) and receives all of the coolant coming from the engine (101). The heat exchange part (130) includes a first heat exchanger (131) for receiving, accommodating and discharging a first vehicle fluid. The first vehicle fluid inside the first heat exchanger (131) is heat exchanged with the coolant inside the heat exchange part (130), thereby being able to be warmed or cooled.

The pump (103) is in fluid communication with the engine (101) for delivering a coolant to the engine (101).

The radiator (104) is provided in a first branch coolant circuit (110) and is in fluid communication with the valve body part (120) so as to receive none, some or all of the coolant coming from the valve body part (120).

The unit heater (105) and throttle body warmer (106) are provided in a second branch coolant circuit (111) and are in fluid communication with valve body part (120) so as to receive none, some or all of the coolant coming from the valve body part (120).

The engine bypass (107) is in a third branch coolant circuit (112) and in fluid communication between the valve body part (120) and the heat exchange part (130) so as to receive none, some or all of the coolant coming from the valve body part (120). The third branch circuit (112) can either be formed integrally between the valve body part (120) and heat exchange part (130) or be formed separately with a communication device.

The coolant passing through the first branch coolant circuit (110) is delivered back to the pump (103) after passing through the heat exchange part (130). The coolant passing through the second branch coolant circuit (111) is delivered back to the pump (103) after passing through the heat exchange part (130). The coolant passing through the third branch coolant circuit (112) is delivered back to the pump (103) after passing through the heat exchange part (130). The number of the branch coolant circuits (110, 111, 112) controlled by the device (10) can be adjusted as long as packaging space permits and proper function is ensured and/or depending on design choice.

Preferably, the system may further include additional branch coolant circuit(s) that can flow a fluid(s) to and from other possible supply source(s) requiring cooling and/or warming depending on cooling system design and requirements. The coolant flow would be controlled through the branch coolant circuits by the valve body part (120) of the device (10).

Suitably, the system may further include additional heat exchanger(s). Preferably, the heat exchanger(s) may be connected in parallel or series with existing circuits like the throttle body (106) connected to the unit heater (105), may be connected in parallel or series with at least one of the branch coolant circuits (110, 111, 112), or may have its own independent branch circuit but deliver the coolant back to the pump after passing through the heat exchange part (130).

As discussed above, as shown in FIG. 5, the heat exchange part (130) may further include a second heat exchanger (132) for receiving, accommodating and discharging a second vehicle fluid. The second vehicle fluid inside the second heat exchanger (132) is heat exchanged with the coolant inside the heat exchange part (130), thereby being able to be warmed or cooled. The second vehicle fluid may be identical to or different from the first vehicle fluid. The second vehicle fluid can be any type of vehicle fluid for use in systems or devices within a vehicle for cooling or warming purpose. Examples of the second vehicle fluid include, but not limited to, a transmission oil, an engine oil, or a power steering oil, a differential oil, a trans axle oil, an electric cooler fluid, a converter oil, a generator oil, an a/c cabin refrigerant.

As discussed above, the first heat exchanger (131) can be positioned on a portion of the supply source housing (e.g., transmission housing) (102), in which case the fluid path would require no additional connecting hardware.

Figure 3:
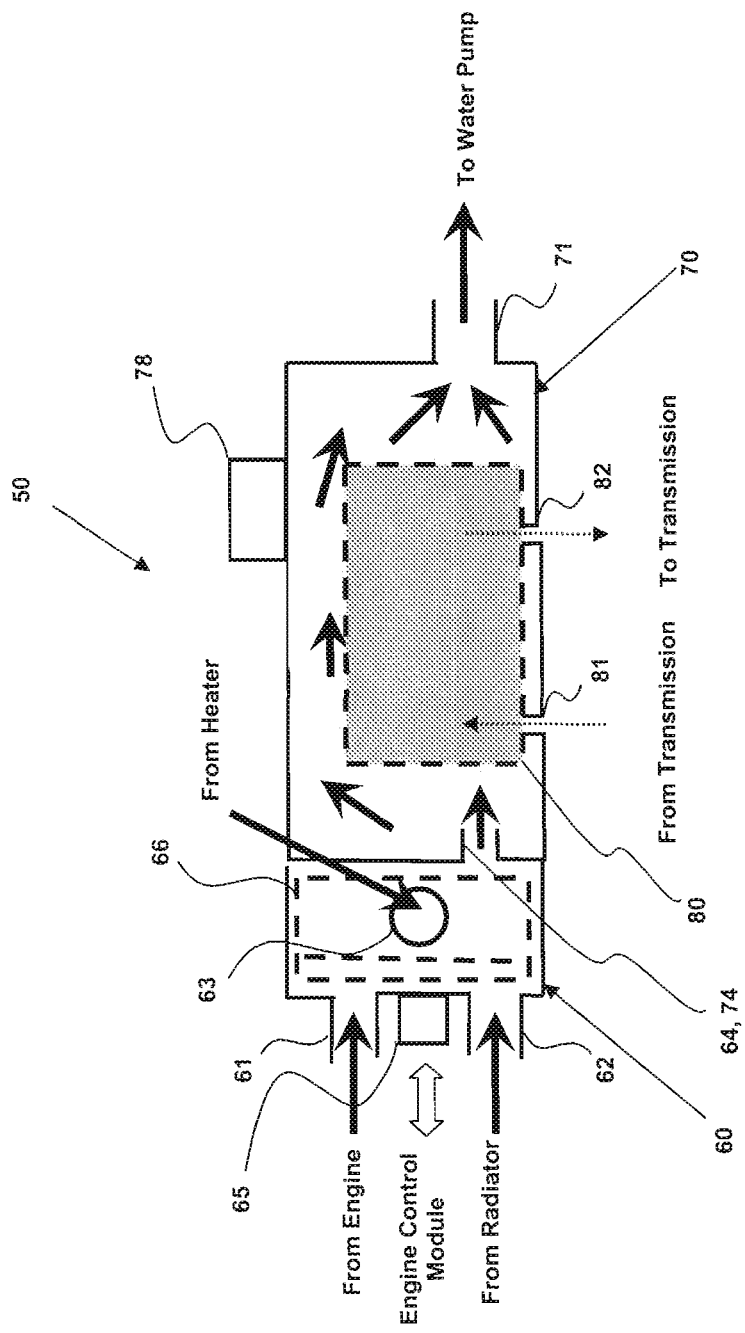
FIG. 3 shows an integrated coolant flow control and heat exchange device according to a second embodiment of the present invention.

FIG. 3 shows an integrated coolant flow control and heat exchange device (50) for a vehicle according to a second preferred embodiment of the present invention. The integrated coolant flow control and heat exchange device (50) includes a valve body part (60) and a heat exchange part (70).

The device (50) according to the second embodiment is similar to the device (10) according to the first embodiment except for some aspects. One difference is that the device (50) has the valve body part (60) located upstream of the heat exchange part (70) and is down stream of all other branch coolant circuits within the system such that the coolant leaving the engine flows through all branch coolant circuits before entering the valve body part (60). Another difference is that the device (50) requires an additional external branch coolant circuit for the engine bypass (240) flow and an additional inlet pipe (i.e., first inlet (61)) and all the branch coolant circuits are pressurized by the pump.

The valve body part (60) includes at least one inlet and at least one outlet. Preferably, as shown in FIG. 3, it may include a first inlet (61), a second inlet (62), a third inlet (63), and an outlet (64). The heat exchange part (70) includes at least one inlet and at least one outlet. Preferably, it may include an outlet (71) and a first inlet (74).

The first inlet (61) of the valve body part (60) is provided for receiving a coolant coming from the engine. The second inlet (62) of the valve body part (60) is provided for receiving a coolant coming from the radiator. The third inlet (63) of the valve body part (60) is provided for receiving a coolant coming from the unit heater. The outlet (71) of the heat exchange part (70) is provided for discharging all the coolant from the heat exchange part (70) toward the pump. The first inlet (74) of the heat exchange part (70) is provided to receive all the coolant coming from the valve body part (60). The outlet (64) of the valve body part (60) is connected to the inlet (74) of the heat exchange part (70) so that all of the coolant inside the valve body part (60) can be delivered to the heat exchange part (70) to thereby warm up and cool down the supply source fluid (e.g., transmission oil) inside the heat exchanger (80) by heat exchange therebetween.

The valve body part (60) further includes a flow wall (66). The flow wall (66) functions to control the amount of a coolant flowing from various system circuits. The flow wall (66) may be shaped like, e.g., an inverted cup with varying opening shapes made in the cup which coincides with the different inlets. The flow wall (66) is capable of blocking all flow from the inlets or controlling any percent of flow up to full flow through any inlet depending on system requirements. The flow amount can be, suitably, controlled by unique controlled opening patterns located in the flow wall designed to meet specific system coolant flow amounts based on circuit requirements.

The heat exchange part (70) further includes a heat exchanger (80) provided inside the heat exchange part (70). The heat exchanger (80) includes at least one inlet and at least one outlet. Preferably, it may include an inlet (81) and an outlet (82), as shown in FIG. 3. The inlet (81) is provided for receiving a vehicle fluid (e.g., transmission oil) from a supply source (e.g., transmission) and the outlet (82) is provided for discharging the vehicle fluid from the heat exchanger (80) toward the supply source, by which the heat exchanger (80) is in fluid communication with the supply source.

The device (50) further includes an actuator (65) on or near the valve body part (60). The actuator (65) is configured to operate in response to a control signal from the engine control module so as to selectively operate the movement of the flow wall (66) within the flow body part (60) in response to the control signals from the engine control module. The actuator (65) can be realized in various forms known in the art. One example is a step motor controlled by a signal received from the engine controller which, depending on coolant and oil temperatures, can control the flow wall (66) position to optimize coolant flow within the various circuits.

Preferably, the device (50) further includes a pressure cap (78) on a portion of the heat exchange part (70). As discussed above, the pressure cap (78), like the pressure cap (38), may function as a controller of the coolant operating pressure within the system and/or as an access point in the system for adding coolant for system servicing.

The shape, size, and position of the valve body part (60) are not limited to particular shape, size, and location and can be adjusted according to design choices and/or operational conditions. For instance, the vertical direction cross section of the valve body part (60) may be circular such that the flow wall (66) can rotate within the valve body part (60) and control the flow amount within the various branch coolant circuits.

Likewise, the position, shape and size of the inlets (61, 62, 63) and the outlet (64) of the valve body part (60), the outlet (71) and the first inlet (74) of the heat exchange part (70), and the inlet (81) and the outlet (82) of the heat exchanger (80) are not limited to particular ones and can be independently adjusted according to design choices and/or operational conditions. For example, the inlets (61, 62, 63, 74, 81) and the outlets (64, 71, 82) each may have a circular cross section. Preferably, some or all of the inlets (61, 62, 63, 74, 81) and the outlets (64, 71, 82) may be designed to have identical or different shapes and sizes. Suitably, the outlet (64) and the inlet (74) may be formed integrally or separately. For example, the entire valve body part (60) can be integrated together with the heat exchange part (70) as one integral part with no wall separating the two parts.

Further, additional ports may be added to receive a coolant from other branch coolant circuits (not shown). For example, there may be an additional inlet(s) similar to the inlet (63) which can receive a coolant from other possible branch coolant circuits.

Also, the heat exchanger part may include a plurality of heat exchangers. For example, as shown in FIG. 5, the heat exchange part (230) may include two heat exchangers (231, 232).

Further, the heat exchange part (70) may, suitably, be mounted on a predetermined portion or portions of a supply source housing (202) (e.g., transmission housing) while being in fluid communication with the supply source housing (202). Alternatively, it may be placed remotely from the supply source housing (202) while being in fluid communication with the supply source housing (202).

Likewise, the valve body part (60) may be formed integrally with the heat exchange part (70) while being in fluid communication with the heat exchange part (70). Alternatively, it may be located remotely from the heat exchange part (70) while being in fluid communication with the heat exchange part (70).

In an exemplary embodiment, as shown in FIG. 5, the heat exchange part (230) may be mounted on a portion of the supply source housing (202) (e.g., transmission housing). The heat exchange part (230) may have a first heat exchanger (231) and a second heat exchanger (232). In this case, although not shown, the valve body part (60) may be disposed in the above-described manner.

In this embodiment, the first heat exchanger (231) may be in fluid communication with the supply housing (202) through a first heat exchanger inlet (251) and a first heat exchanger outlet (252), which are similar to the inlet (41) and outlet (42), respectively. The first heat exchanger inlet (251) and outlet (252) can be formed either in the supply source housing (202) while being in fluid communication with the first heat exchanger (231) or with other vehicle system(s) while being in fluid communication with the first heat exchanger (231). The second heat exchanger (232) may be in fluid communication with the supply source housing (202) through a second heat exchanger inlet (not shown) and a second heat exchanger outlet (not shown) which are similar to the first exchanger inlet (251) and outlet (252). Alternatively, the second heat exchanger (232) may be designed to be in fluid communication with additional vehicle systems (not shown) that need either cooling or warming. As discussed above, the mounting position of the heat exchange part and the number of the heat exchangers located within the heat exchange part can be adjusted according to design choice and operational condition.

Figure 4:
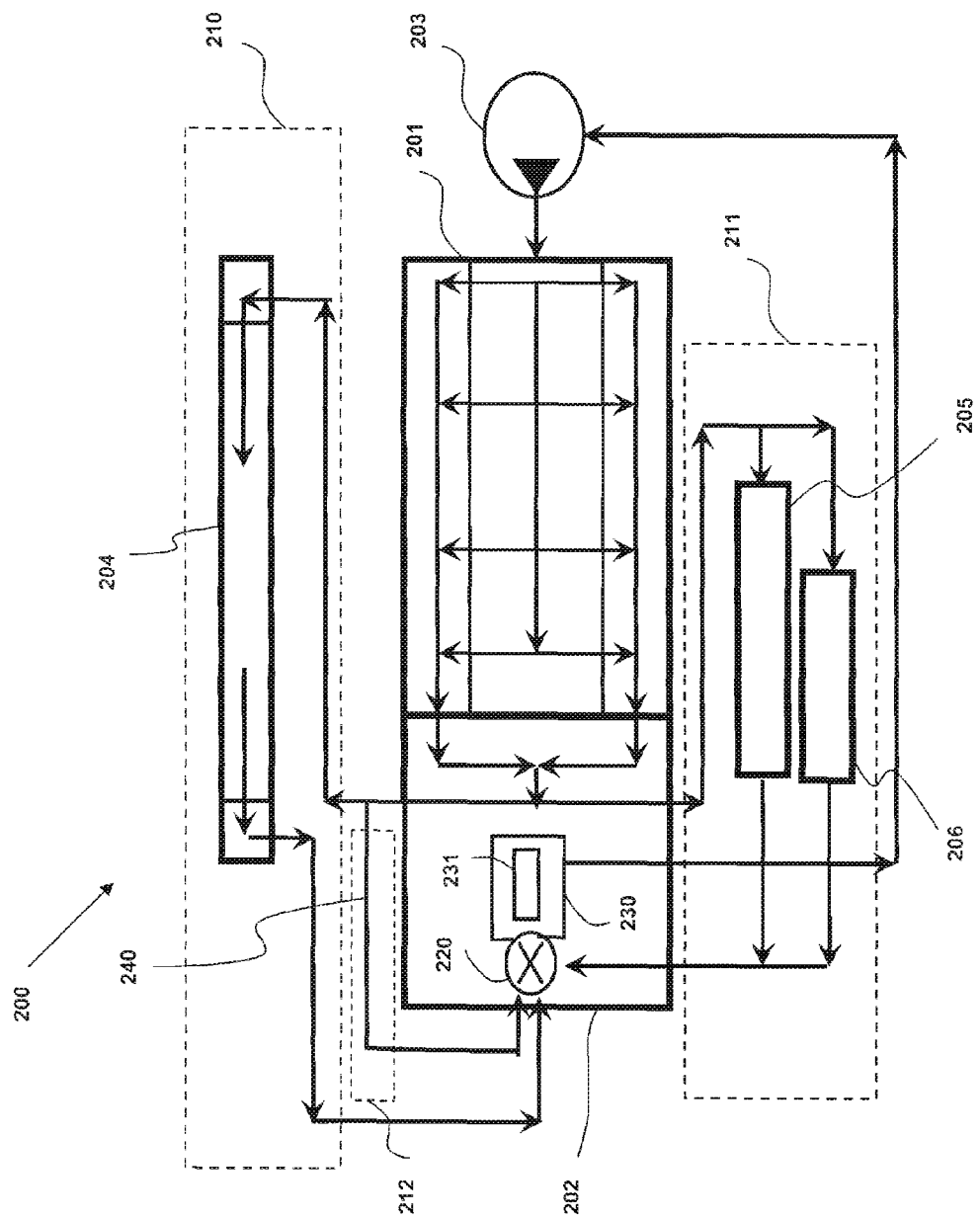
FIG. 4 shows a coolant flow control system including the device of FIG. 3.

Referring to FIG. 4, a coolant flow control system (200) for a vehicle including the integrated coolant flow control and heat exchange device according to the second embodiment is described.

The coolant flow control system (200) includes an integrated coolant flow control and heat exchange device (50), an engine (201), a pump (203), a radiator (204), a unit heater (205) and a throttle body warmer (206).

The integrated coolant flow control and heat exchange device (50) includes a valve body part (220) and a heat exchange part (230) in fluid communication with the valve body part (220). The heat exchanger part (230) includes therein a first heat exchanger (231) for receiving, accommodating and discharging a first vehicle fluid. The first vehicle fluid inside the first heat exchanger (231) is heat exchanged with the coolant inside the heat exchange part (230), thereby being able to be warmed or cooled.

The pump (203) is in fluid communication with the engine (201) for delivering a coolant to the engine (201).

The radiator (204) is provided in a first branch coolant circuit (210) and is in fluid communication with the engine so as to receive some or all of the coolant coming from the engine (201).

The unit heater (205) is provided in a second branch coolant circuit (211) and is in fluid communication with the engine so as to receive some or all of the coolant coming from the engine (201).

The engine bypass (240) is provided in a third branch coolant circuit (212) and is in fluid communication with the engine so as to receive some or all of the coolant coming from the engine (201).

All the coolant passing through the first branch coolant circuit (210) is delivered back to the pump (203) after passing through the valve body part (220) and then the heat exchange part (230). All the coolant passing through the second branch coolant circuit (211) is delivered back to the pump (203) after passing through the valve body part (220) and then the heat exchange part (230). All the coolant passing through the third branch coolant circuit (212) is delivered back to the pump (203) after passing through the valve body part (220) and then the heat exchange part (230). This would also be true for any other additional branch coolant circuits that may be part of an engine cooling system.

Preferably, the system may further include at least one additional branch coolant circuit(s) that can flow a fluid(s) to and from other possible supply source(s) requiring cooling or warming depending on cooling system design and requirements.

Suitably, the system may further include additional heat exchanger(s). Preferably, the additional heat exchanger(s) may be connected in parallel or series with existing circuits like the throttle body (206) connected to the unit heater (205), may be connected in parallel or series with at least one of the branch coolant circuits (210, 211, 212), or may have its own independent branch circuit but deliver the coolant back to the pump after passing through the valve body part (220) and the heat exchange part (230).

As discussed above, as shown in FIG. 5, the heat exchange part (230) may further include a second heat exchanger (232) for receiving, accommodating and discharging a second vehicle fluid. The second vehicle fluid inside the second heat exchanger (232) is heat exchanged with the coolant inside the heat exchange part (230), thereby being able to be warmed or cooled. The second vehicle fluid may be identical to or different from the first vehicle fluid. The second vehicle fluid can be any type of vehicle fluid for use in systems or devices within a vehicle for cooling or warming purpose. Examples of the second vehicle fluid include, but not limited to, a transmission oil, an engine oil, or a power steering oil, a differential oil, a trans axle oil, an electric cooler fluid, a converter oil, a generator oil, an a/c cabin refrigerant.

As discussed above, the first heat exchanger (231) can be positioned on a portion of the supply source housing (e.g., transmission housing) (202), in which case the fluid path would require no additional connecting hardware.

According to the coolant flow control system (100, 200), the fluid (transmission oil) can be warmed or cooled quickly. More particularly, in the case of warm up mode, all the coolant from all cooling branch circuits (110, 111, 112, 210, 211, 212) which is warmer than the supply source fluid (transmission oil), is controlled to pass over the heat exchanger (131, 231) before returning to the pump (103, 203), thereby warming the supply source fluid (transmission oil) with the waste heat produced from other vehicle areas. In addition to the quick warming, it can maintain the average supply source fluid (transmission oil) temperature higher during cold weather driving with less supply source fluid (transmission oil) temperature variation, thus improving fuel economy due to the improvements in oil lubricity within the supply source device (transmission) and seal durability.

On the other hand, in case of cooling mode, all the coolant from the engine, which is cooler than the supply source fluid (transmission oil), is controlled to pass over the heat exchanger (131, 231) before returning to the pump (103, 203), thereby cooling the supply source fluid (transmission oil). In addition to the quick cooling, it can maintain the average supply source fluid (transmission oil) temperature near the optimum temperature or within the permissible temperature, thus improving fuel economy due to the improvements in oil lubricity within the transmission and seal durability.

In addition to the above-discussed valve body coolant control features, the valve body part (20, 60) achieved by controlling the positioning of the flow wall (26, 66) within the valve body (20, 60) provides the following features:

1) Rapid Engine Warm-Up Mode: In this fully blocked mode, the flow wall (26, 66) can be positioned within the valve body (20, 60) so as to allow no coolant flow within any circuit or the engine. This condition is desired on cold engine start up where all heat generated within the engine is used to rapidly warm up the coolant and improve cold start fuel economy.

2) Default/Service Fill Mode: In the Default/Service Fill mode, at the position at which the flow wall (26, 66) is located when the actuator (25, 65) loses the signal from the engine control module, the flow wall (26, 66) will reach a position which will allow flow through all branches of the coolant flow control system and protect the vehicle from overheating during operation and improve service draining and filling process during vehicle servicing.

Another unique feature of the integrated coolant flow control and heat exchanger devices (10, 50) is that any coolant flow in any of the coolant branch circuits must pass through the heat exchange part (130, 230) and then by the heat exchanger before returning to the pump (103, 203), thereby maximizing the heat exchange performance.

According the present devices and systems, the vehicle fluid (e.g. transmission oil) can be warmed up or cooled down quickly. Also, with the integrated design of the present invention, space utilization can be improved and the number of components consisting of the system can be reduced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated coolant flow control and heat exchange device (10) for a vehicle including an internal combustion engine, a transmission, a unit heater, a radiator, an engine control module, and a pump for delivering an engine coolant to the engine, the device comprising:
   a heat exchange part (30) which includes an outlet (31) that discharges a coolant from the heat exchange part (30) toward the pump, a first inlet (32) that is connected to receive a coolant coming directly from the radiator, a second inlet (33) that is connected to receive a coolant coming from the unit heater, and a heat exchanger (40) provided inside the heat exchange part (30), the heat exchanger (40) including an inlet (41) that is connected to receive from a source of supply a vehicle fluid and an outlet (42) that discharges the vehicle fluid from the heat exchanger (40) toward the supply source by which the heat exchanger (40) is in fluid communication with the supply source; and
   a valve body part (20) which includes an inlet (21) that is connected to receive from a coolant coming from the engine, a first outlet (22) that discharges a coolant from the valve body part toward the radiator, and a second outlet (23) that discharges a coolant from the valve body part toward the unit heater,
   wherein the valve body part (20) further includes a third outlet (24), the heat exchange part (30) further includes a third inlet (34), and the third outlet (24) of the valve body part (20) is connected to the third inlet (34) of the heat exchange part (30) thereby making the valve body part (20) and the heat exchange part (30) in fluid communication with each other which functions as the engine bypass so that none, some or all of the coolant inside the valve body part (20) are delivered to the heat exchange part (30) to warm up and cool down the vehicle fluid inside the heat exchanger (40) by heat exchange therebetween,
   wherein the heat exchanger part (30) includes therein a first heat exchanger and a second heat exchanger for receiving, accommodating and discharging a first and second vehicle fluid, respectively whereby the first and second vehicle fluid in the first and second heat exchanger are warmed or cooled by heat exchange with the coolant in the heat exchange part (30).

2. The device according to claim 1, wherein the valve body part (20) further includes a flow wall (26) that controls flow within all the coolant branch circuits by varying size openings on the flow wall (26).

3. The device according to claim 2, further comprising an actuator (25) operable in response to a control signal from the engine control module so as to selectively operate the movement of the flow wall (26) which opens, varies and/or closes the flow through the outlets (22, 23, 24) of the valve body part (20).

4. The device according to claim 1, further comprising a pressure cap (38) on a portion of the heat exchange part (30) that controls system operating pressure and/or system servicing (filling).

5. The device according to claim 1, wherein the heat exchange part (30) is directly mounted on the fluid supply source.

6. The device according to claim 1, wherein the third outlet (24) of the valve body part (20) and the third inlet (34) of the heat exchange part (30) are formed integrally.

7. The device according to claim 1, wherein all coolant flow from the inlets (32, 33, 41) converge and pass over the heat exchanger (40).

8. An integrated coolant flow control and heat exchange device (50) for a vehicle including an internal combustion engine, a transmission, a unit heater, a radiator, an engine control module, and a pump for delivering an engine coolant to the engine, the device comprising:
  a heat exchange part (70) which includes an outlet (71) that discharges a coolant from the heat exchange part (70) toward the pump and a heat exchanger (80) provided inside the heat exchange part (70), the heat exchanger (80) including an inlet (81) that is connected to receive a vehicle fluid from a supply source and an outlet (82) that discharges a vehicle fluid from the heat exchanger (80) toward the fluid supply source by which the heat exchanger (80) is in fluid communication with the fluid supply source; and
  a valve body part (60) which includes a first inlet (61) that is connected to receive a coolant coming from the engine, a second inlet (62) that is connected to receive a coolant coming from the radiator, and a third inlet (63) that is connected to receive a coolant coming from the unit heater,
  wherein the valve body part (60) further includes an outlet (64), the heat exchange part (70) further includes an inlet (74), and the outlet (64) of the valve body part (60) is connected to the inlet (74) of the heat exchange part (70) so that all of the coolant inside the valve body part (60) can be delivered to the heat exchange part (70) to warm up and cool down the vehicle fluid inside the heat exchanger (80) by heat exchange there between,
  wherein the heat exchanger part (70) includes therein a first heat exchanger and a second heat exchanger for receiving, accommodating and discharging a first and second vehicle fluid, respectively whereby the first and second vehicle fluid in the first and second heat exchanger are warmed or cooled by heat exchange with the coolant in the heat exchange part (70).

9. The device according to claim 8, wherein the valve body part (60) further includes a flow wall (66) that controls flow within all the branch coolant circuits by varying a size of openings on the flow wall (66).

10. The device according to claim 9, further comprising an actuator (65) operable in response to a control signal from the engine control module so as to selectively operate the movement of the flow wall (66) which opens/varies and/or closes the fluid through the inlets (61, 62, 63) of the valve body part (60).

11. The device according to claim 8, further comprising a pressure cap (78) on a portion of the heat exchange part (70) for controlling system operating pressure and/or system servicing (filling).

12. The device according to claim 8, wherein the heat exchange part (70) is directly mounted on the fluid supply source.

13. The device according to claim 8, wherein the third outlet (64) of the valve body part (60) and the inlet (74) of the heat exchange part (70) are formed integrally so that all of coolant inside the valve body part (60) can be delivered to the heat exchange part (70).

14. The device according to claim 8, wherein all coolant flow from the inlets (61, 62, 63) converge and passes through the heat exchange part (70) and over the heat exchanger (80).

15. A coolant flow control system (100) for a vehicle, comprising:
  an engine (101);
  a pump (103) in fluid communication with the engine (101) that delivers a coolant to the engine (101);
  an integrated coolant flow control and heat exchange device (10) including a valve body part (120) and a heat exchange part (130) in fluid communication with the valve body part (120), the valve body part (120) being in fluid communication with the engine (101) so as to receiving all of the coolant coming from the engine (101);
  a radiator (104) provided in a first branch coolant circuit (110) and being in fluid communication with the valve body part (120) so as to receive none, some or all of the coolant coming from the valve body part (120); and
  a unit heater (105) provided in a second branch coolant circuit (111) and being in fluid communication with valve body part (120) so as to receive none, some or all of the coolant coming from the valve body part (120), and
  an engine bypass (107) provided in a third branch coolant circuit (112) and being in fluid communication with the valve body part (120) so as to receive none, some or all of the coolant coming from the valve body part (120),
  wherein the coolant passing through the first branch coolant circuit (110) is delivered back to the pump (103) after passing through the heat exchange part (130), and the coolant passing through the second branch coolant circuit (111) is delivered back to the pump (103) after passing through the heat exchange part (130) and the coolant passing through the third branch coolant circuit (112) is delivered back to the pump (103) after passing through the heat exchange part (130),
  wherein the heat exchanger part (130) includes therein a first heat exchanger (131) and a second heat exchanger (132) for receiving, accommodating and discharging a first and second vehicle fluid, respectively whereby the first and second vehicle fluid in the first and second heat exchanger (132) are warmed or cooled by heat exchange with the coolant in the heat exchange part (130).

16. The system according to claim 15, further including at least one additional heat exchanger for cooling or warming which can be connected in parallel or series with a throttle body (106) connected to the unit heater (105), can be in series or parallel with the other branch coolant circuit (110, 111, 112) or have its own independent branch circuit but deliver the coolant back to the pump after passing through the heat exchange part (130).

17. The system according to claim 15, wherein the valve body part (120) includes therein a flow wall (26) which can accommodate two unique system attribute flow features.

18. The system according to claim 15, wherein the first vehicle fluid is selected from the group comprising a transmission oil, an engine oil, a power steering oil, a differential oil, a trans axle oil, electric cooler fluid, converter oil, generator oil, and a/c cabin refrigerant.

19. The system according to claim 15, wherein the second vehicle fluid is selected from the group comprising a transmission oil, an engine oil, a power steering oil, a differential oil, a trans axle oil, electric cooler fluid, converter oil, generator oil, and a/c cabin refrigerant.

20. A coolant flow control system (200) for a vehicle, comprising:
  an engine (201);
  a pump (203) in fluid communication with the engine (201) that delivers a coolant to the engine (201);
  a radiator (204) provided in a first branch coolant circuit (210) and being in fluid communication with the engine so as to receive some or all of the coolant coming from the engine;
  a unit heater (205) provided in a second branch coolant circuit (211) and being in fluid communication with the engine so as to receive some or all of the coolant coming from the engine;

an engine bypass (240) provided in a third branch coolant circuit (212) and being in fluid communication with the engine so as to receive some or all of the coolant coming from the engine (201); and an integrated coolant flow control and heat exchange device including a valve body part (220) and a heat exchange part (230) in fluid communication with the valve body part, wherein the coolant passing through the first branch coolant circuit (210) is delivered back to the pump (203) after passing through the valve body part (220) and then the heat exchange part (230), and the coolant passing through the second branch coolant circuit (211) is delivered back to the pump (203) after passing through the valve body part (220) and then the heat exchange part (230) and the coolant passing through the third branch coolant circuit (212) is delivered back to the pump (203) after passing through the valve body part (220) and then the heat exchange part (230), wherein the heat exchanger part (230) further includes a first heat exchanger (231) and a second heat exchanger (232) for receiving, accommodating and discharging a first and a second vehicle fluid whereby the first and the second vehicle fluid in the second heat exchanger (232) are warmed or cooled by heat exchange with the coolant in the heat exchange part (230).

21. The system according to claim 20, further including at least one additional heat exchanger for cooling or warming which can be connected in parallel or series with a throttle body (206) connected to the unit heater (205), can be in series or parallel with the other branch coolant circuit (210, 211, 212) or have its own independent branch circuit but deliver the coolant back to the pump after passing through the heat exchange part (230).

22. The system according to claim 20, further including at least one additional branch coolant circuit.

23. The system according to claim 20, wherein the valve body part (220) includes therein a flow wall (66) which can accommodate two unique system attribute flow features.

24. The system according to claim 20, wherein the first vehicle fluid is selected from the group comprising a transmission oil, an engine oil, a power steering oil, a differential oil, a trans axle oil, electric cooler fluid, converter oil, generator oil, and a/c cabin refrigerant.

25. The system according to claim 20, wherein the second vehicle fluid is selected from the group comprising a transmission oil, an engine oil, a power steering oil, a differential oil, a trans axle oil, electric cooler fluid, converter oil, generator oil, and a/c cabin refrigerant.

* * * * *